3,660,400
LOWER ALKYL 3-HYDROXY AND
3-MERCAPTOPYRAZINOATES
Edward J. Cragoe, Jr., Lansdale, and James H. Jones, Blue Bell, Pa., assignors to Merck & Co., Inc., Rahway, N.J.
No Drawing. Original application Nov. 17, 1966, Ser. No. 594,996, now Patent No. 3,472,848, dated Oct. 14, 1969. Divided and this application July 29, 1969, Ser. No. 845,890
Int. Cl. C07d 51/76
U.S. Cl. 260—250 R    5 Claims

ABSTRACT OF THE DISCLOSURE

Lower alkyl 3-hydroxy- and 3-mercapto-pyrazinoates and corresponding ethers and thioethers are prepared by diazotization of lower alkyl 3-aminopyrazinoates followed by treatment with water to give the 3-hydroxy compounds, or an alcohol to give the 3-ether compounds and with bromine and hydrogen bromide to give the 3-bromo compounds. The latter compounds are then converted into the 3-mercapto compounds by treatment with sodium sulfide and sulfur or into the 3-thio-ethers by treatment with an alkali metal mercaptide. The compounds are useful as intermediates for the preparation of the corresponding pyrazinoylguanidines which have utility as diuretic and saluretic compounds.

This application is a division of our copending application S.N. 594,996, filed Nov. 17, 1966 now U.S. Patent 3,472,848, issued Oct. 14, 1909, the entire disclosure of which is incorporated herein by reference.

SUMMARY OF THE INVENTION

This invention relates to lower alkyl pyrazinoates of the following structural formula:

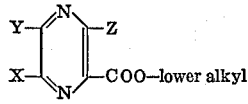

wherein Z represents
(a) OR[7] wherein R[7] represents
    (1) hydrogen,
    (2) loweralkyl of from 1 to 5 carbon atoms,
    (3) phenyl-lower alkyl, and
(b) SR[8] wherein R[8] represents
    (1) hydrogen,
    (2) loweralkyl of from 1 to 5 carbon atoms,
    (3) aralkyl, such as benzyl and phenethyl, and
    (4) aryl, preferably phenyl;

X represents
(a) hydrogen,
(b) halo such as chloro, bromo and iodo,
(c) loweralkyl of from 1 to 5 carbon atoms,
(d) lower cycloalkyl of from 3 to 6 carbon atoms, and
(e) mononuclear aryl, especially phenyl either unsubstituted or substituted preferably with halogen such as chloro or bromo;

Y represents
(a) hydrogen,
(b) hydroxy,
(c) lower-alkoxy of from 1 to about 5 carbon atoms,
(d) lower-alkylthio of from 1 to about 3 carbon atoms,
(e) loweralkyl of from 1 to about 5 carbon aatoms,
(f) $\omega,\omega,\omega$-trifluorolower-alkyl such as trifluoromethyl, trifluoroethyl and the like,
(g) lower-cycloalkyl having 3 to 6 carbons, and
(h) mononuclear-aryl, preferably phenyl;

X and Y can be linked together to form a 4-membered carbon chain either unsaturated or saturated, either unsubstituted or substituted with, for example, a halogen to form compounds such as tetrahydroquinoxaline or quinoxaline derivatives.

The novel compounds of this invention wherein Z represents OR[7] are prepared by diazotization of the corresponding loyer alkyl 3-aminopyrazinoates, followed by treatment of the diazotization mixture with water (R[7]=H) or an alcohol of formula R[7]OH.

Where Z represents SR[8] in the novel compounds they are prepared by diazotization of the corresponding lower alkyl 3-aminopyrazinoates in a mixture of bromine, hydrobromic acid and acetic acid to provide the lower alkyl 3-bromopyrazinoates which are then converted to the corresponding 3-mercapto compounds (R[8]=H) by treatment with a mixture of sodium sulfide and sulfur, and the 3-substituted thio compounds by treatment with an alkali metal mercaptan (e.g., NaSR[8]).

The novel compounds of this invention are useful intermediates in the preparation of 3-Z-pyrazinoylguanidines which have utility as diuretic and saluretic agents in the treatment of edema, hypertension and other diseases known to be responsive to diuretic therapy.

What is claimed is:
1. A compound of structural formula

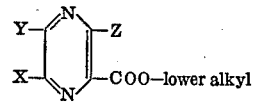

wherein Z is a member selected from the group consisting of
  (a) OR[7], wherein R[7] is a member selected from the group consisting of
      (1) hydrogen,
      (2) lower-alkyl,
      (3) phenyl lower-alkyl, and
  (b) SR[8], wherein R[8] is a member selected from the group consisting of
      (1) hydrogen,
      (2) lower-alkyl,
      (3) phenyl lower-alkyl,
      (4) phenyl;
X is a member selected from the group consisting of
  (a) hydrogen,
  (b) halogen,
  (c) lower-alkyl,
  (d) $C_{3-6}$ cycloalkyl,
  (e) phenyl, and
  (f) halophenyl;
Y is a member selected from the group consisting of
  (a) hydrogen,
  (b) hydroxy,
  (c) lower alkoxy,
  (d) lower alkylthio,
  (e) lower-alkyl,
  (f) $\omega,\omega,\omega$-trifluoro lower-alkyl,
  (g) cyclolower alkyl,
  (h) phenyl;

X and Y can be linked together to form with the pyrazine moiety a quinoxaline or tetrahydroquinoxaline compound.

2. A compound as claimed in claim 1, wherein Z is —$OR^7$.

3. A compound as claimed in claim 2, wherein X is halogen.

4. A compound as claimed in claim 1, wherein Z is —$SR^8$.

5. A compound as claimed in claim 4, wherein X is halogen.

References Cited
UNITED STATES PATENTS 3,472,848 10/1969 Cragoe et al. ........ 260—250
3,527,759 9/1970 Shepard ............ 260—250

NICHOLAS S. RIZZO, Primary Examiner

U.S. Cl. X.R.

424—250